(12) United States Patent
Kanpurwala et al.

(10) Patent No.: US 7,931,388 B2
(45) Date of Patent: Apr. 26, 2011

(54) UNIVERSAL EXTENSIVE SECTOR LIGHT RING FOR MICROSCOPY AND VIDEO INSPECTION SYSTEMS

(75) Inventors: Bakir Kanpurwala, Ann Arbor, MI (US); Charles Zhang, Shenzhe (CH)

(73) Assignee: Aven Tools, Inc., Ann Arbor, MI (US)

( * ) Notice: Subject to any disclaimer, the term of this patent is extended or adjusted under 35 U.S.C. 154(b) by 183 days.

(21) Appl. No.: 12/179,888

(22) Filed: Jul. 25, 2008
(Under 37 CFR 1.47)

(65) Prior Publication Data
US 2009/0303714 A1 Dec. 10, 2009

Related U.S. Application Data

(60) Provisional application No. 60/951,756, filed on Jul. 25, 2007.

(51) Int. Cl.
*F21V 21/22* (2006.01)
(52) U.S. Cl. ............... 362/249.03; 362/285; 362/249.1; 362/249.09; 362/406; 362/11; 362/418; 362/800
(58) Field of Classification Search .............. 362/285, 362/249.03, 220, 223, 249.02, 249.1, 249.09, 362/405, 406, 426, 427, 428, 11, 17, 18, 362/239, 418, 368
See application file for complete search history.

(56) References Cited

U.S. PATENT DOCUMENTS

| | | | | |
|---|---|---|---|---|
| 4,392,183 A * | 7/1983 | Ostlund et al. | ................. | 362/11 |
| 5,481,439 A * | 1/1996 | Goto | ................. | 362/5 |
| 5,704,702 A * | 1/1998 | Goto | ................. | 362/5 |
| 6,659,620 B2 * | 12/2003 | Goto | ................. | 362/127 |
| 6,870,949 B2 | 3/2005 | Baldwin | | |
| 6,947,666 B2 * | 9/2005 | Chapman et al. | ................. | 396/4 |
| 6,948,823 B2 * | 9/2005 | Pohlert et al. | ................. | 362/11 |
| 7,177,537 B1 * | 2/2007 | Adolphi et al. | ................. | 396/4 |

FOREIGN PATENT DOCUMENTS

JP 2004045592 A * 2/2004

* cited by examiner

*Primary Examiner* — Jong-Suk (James) Lee
*Assistant Examiner* — Leah S Lovell
(74) *Attorney, Agent, or Firm* — Young, Basile, Hanlon & MacFarlane, P.C.

(57) ABSTRACT

An adjustable illumination apparatus includes an illumination source having a housing carrying an illuminatable element. A mount is adapted to surround an imaging system lens. An extensible and retractable support has first and second ends mounts the illumination source to the mount. First and second connections movably couple the first and second ends of the support to the mount and the illumination source. The support includes one or more telescoping legs or a cross link bar assembly. In one aspect, the apparatus includes multiple illumination sources. The connections allow each illumination source to be independently positioned relative to other illumination sources. The illuminatable elements in each illumination source may be independently controlled.

11 Claims, 6 Drawing Sheets

UNIVERSAL EXTENSIVE SECTOR LIGHT RING FOR MICROSCOPY AND VIDEO INSPECTION SYSTEMS

CROSS-REFERENCE TO CO-PENDING APPLICATION

This application claims priority benefit of the filing date of U.S. Provisional Patent Application Ser. No. 60/951,756, filed Jul. 25, 2007, for an "Adjustable Light," the contents of which are incorporated herein in its entirety.

BACKGROUND

The present invention relates, in general, to vision optical systems and, more particularly, to illumination devices for imaging optics.

Machine vision optical systems are employed to obtain a digital image of an object in the field of view of the optical system for analysis. In order to accurately image the object, so as to be able to determine if the object has any surface defects, or to determine the dimensions of the object, illumination is typically required.

Previously, illumination devices in the form of a ring of illuminatable segments, such as light bulbs, LEDs, have been mounted in a ring shaped holder encircling the lens of the camera. This illumination device projects light onto an object spaced from the lens so as to provide sufficient illumination for the lens to obtain an accurate image of the object. Controls to vary the intensity or number of LEDs that are illuminated are known.

However, since machine vision optics are used with objects having a wide range of size, shapes and surface topography, it is still desirable to have an adjustable illumination source which can be positioned to provide adequate illumination onto any point on an object as well as be able to provide illumination to a wide range of object sizes and surface topographies.

SUMMARY

An illumination apparatus for an imaging system having a lens mounted on a housing includes an illumination source with a housing and at least one illuminatable element carried within the housing for emitting light through an opening in the housing, a mount adapted to surround an imaging system lens, at least one extensible and retractable support having first and second ends, the support mounting the illumination source to the mount, a first connection movably coupling the first end of the support to the mount, and a second connection movably coupling the second end of the support to the illumination source.

In one aspect, the at least one support and the illumination source are pivotally movable through the first connection with respect to the mount.

In one aspect the at least one support and the illumination source are pivotally movable through the first connection with respect to the illumination source.

The first connection and the second connection may be a swivel connection swivally connecting the at least one support and one of the mount and the illumination source.

The illumination source may be a plurality of illumination sources, and the at least one support includes a plurality of supports. Each illumination source is movably coupled to one of the supports.

The support may be an extensible and retractable leg. The leg includes first and second telescopingly engaged leg portions.

In one aspect, the leg includes a pair of legs, each leg coupled to one of a pair of first connections and to one of a pair of second connections.

The support may be a cross bar linkage having a pair of first ends and opposed pair of second ends, a pair of first connections coupling the first ends to the mount, and a pair of second connections coupling the second ends to the illumination source.

At least one of the pair of first movable connections and at least one of the pair of second connections may be movable in a track carried in one of the mount and the illumination source.

The illuminatable element may include at least one light emitting diode.

In one aspect, the illumination source may include a plurality of illumination sources, The at least one illuminatable element in the illumination source may include a plurality of illumination elements. The illuminatable elements in each illumination source can be independently controllable with respect to the illuminatable elements in other illumination sources.

In another aspect, the at least one illuminatable element includes a plurality of illuminatable elements; and the intensity of the illuminatable elements, with illumination source being variable.

BRIEF DESCRIPTION OF THE DRAWING

The various features, advantages and other uses of the disclosed adjustable light will become more apparent by referring to the following detailed description and drawing in which.

DETAILED DESCRIPTION

Figure 1:
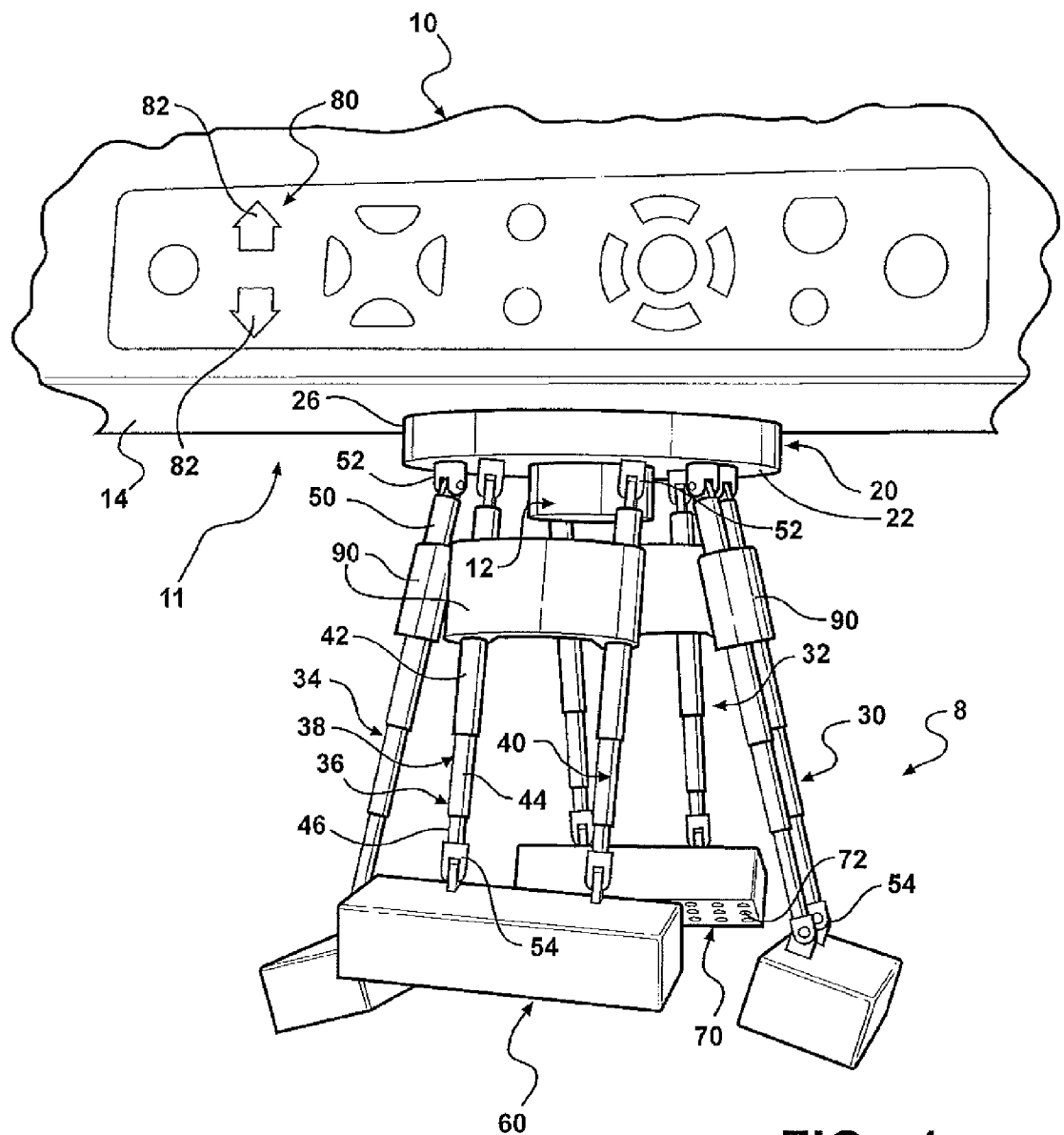
FIG. 1 is a side elevational view of one aspect of an adjustable light usable in a machine vision optical system, with the legs of the adjustable light shown in a partial extended position.
Figure 2:
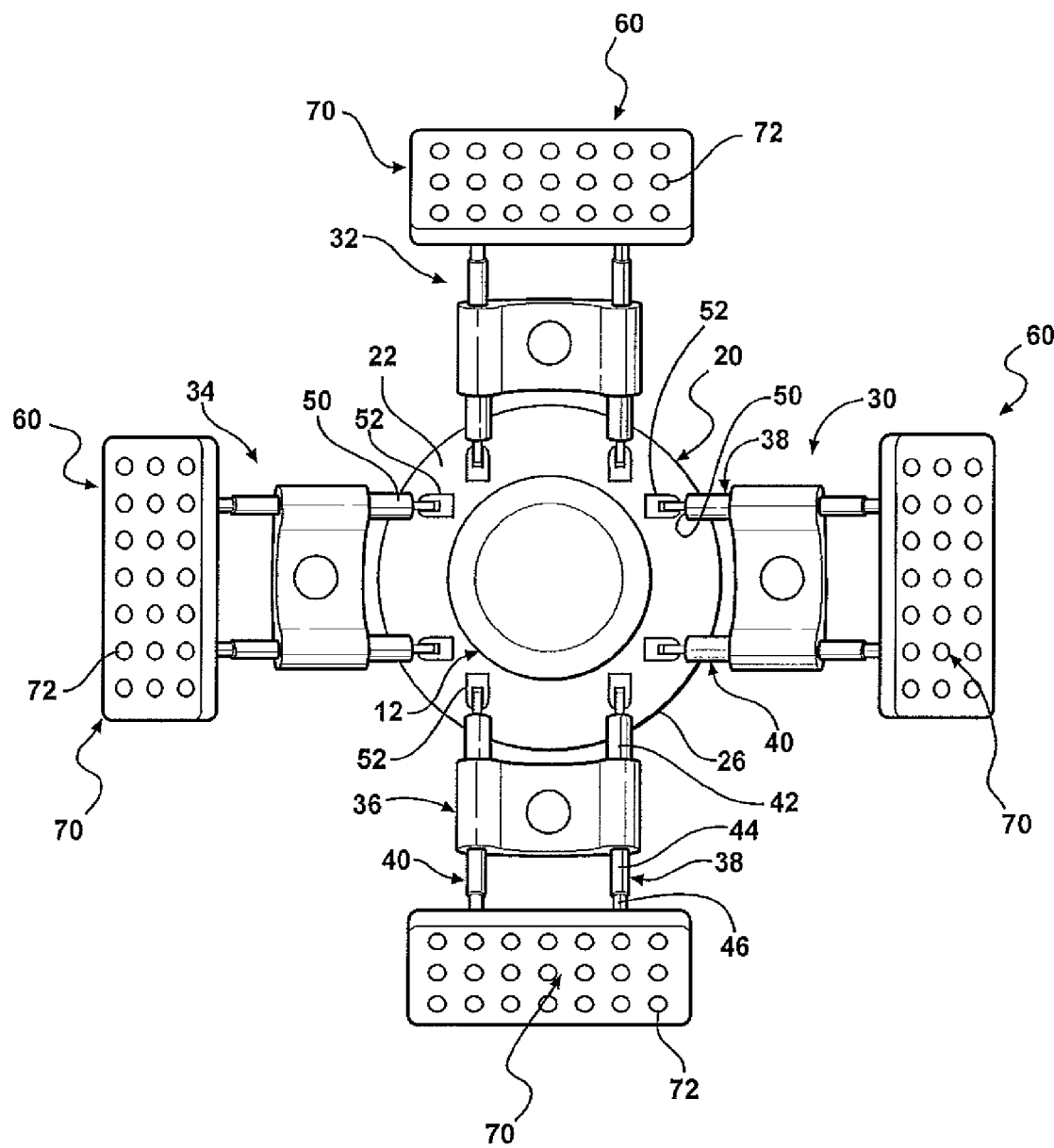
FIG. 2 is a bottom elevational view of the adjustable light shown in FIG. 1.
Figure 3:
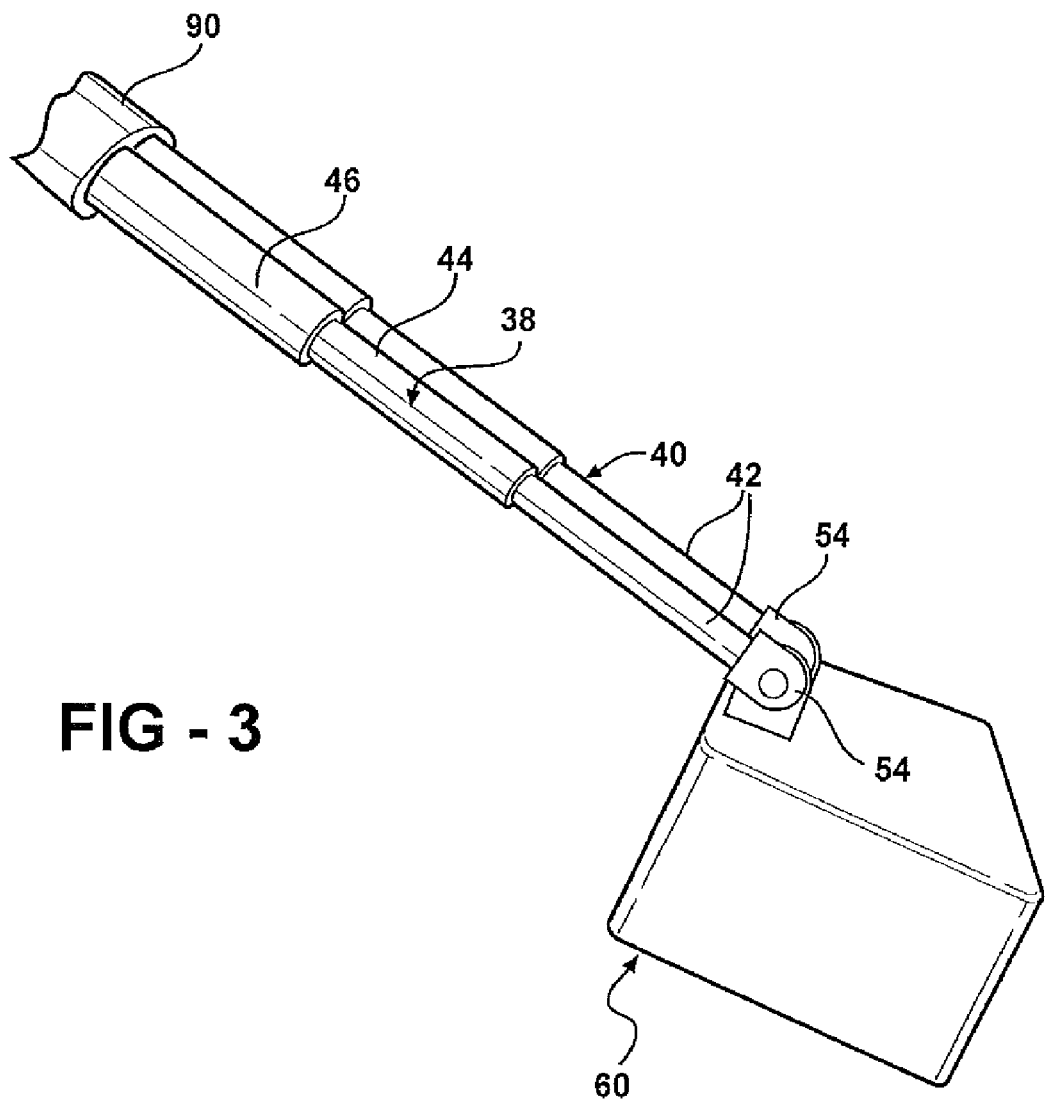
FIG. 3 is a perspective view showing one of the legs of the light in an extended position.

As shown in FIGS. 1-4, an illumination source 8 for a microscope, camera or other machine vision optical system 10 is illustrated.

FIGS. 1-4 depict by way of example only the bottom portion of a machine vision optical system 10, such as a camera or microscope which has a lens 12 mounted on a bottom surface 14.

The adjustable light source includes a mount on base 20 which may take any shape, such as a polygonal shape or the illustrated circular shape, and have a bottom wall 22 with a plurality of mounting tabs 24 extending radially outward from the bottom wall 22. Each mounting tab 24 is attachable to the bottom surface 14 of a housing 11 of the optical system 10, such as by means of fasteners which extend through apertures 26 in each of the mounting tabs 24 into the housing 11. The bottom surface 22 of the mount or base 20 has a central aperture for disposing the mount 20 around the lens 12 on the bottom surface 14 of the optical system housing 11. An outer sidewall 26 projects from the bottom wall 22.

One or more telescoping legs, with four legs 30, 32, 34 and 36 being illustrated by way of example only in FIGS. 1-4, are carried on the mount on base or mount 20. Each leg 30, 32, 34 and 36 is formed, of at least one or more legs, with two legs 38 and 40 being depicted by way of example only for each leg pair 30, 32, 34 and 36.

Each leg 38 and 40 is formed of a plurality of telescoping segments 42, 44 and 46 by way of example only. Any number of segments and any length segments may be employed to form each of the legs 38 and 40. For example, each leg 38 and 40 may be extended from a fully retracted total length of about three inches, to a total expanded length of about six to eight inches.

One end 50 of each leg 38 and 40 is pivotally connected to a swivel mount 52 which is fixed to the bottom surface 22 of the mount 20 and projects away from the bottom surface 22 in the direction of the side wall 26. The swivel mount 52 and the pivotal connection between the swivel mount 52 and one end of each of the legs 38 and 40 may be constructed to provide up to 180° movement along one axis or a 360° universal movement along a plurality of axes.

The opposite end of each of the legs 38 and 40 is connected to a second swivel joint 54 which provides the same 180° or 360° movement as the swivel mount 52.

An illumination source holder or housing 60 is pivotally connected to the swivel joints 54. This enables the illumination source holder 60 to move with telescoping extension and retraction of the legs 38 and 40 as well as pivotal movement of the legs 38 and 40 about the first end connection to the swivel joints 52 on the mount 20. Each light holder 60 may also be individually pivoted about the swivel joint 54 to direct the light emanating from the light source carried by the holder 60 in various directions.

An illumination source 70 is carried within each holder 60 and connected to electric power, typically by one or more wires or conductors, not shown, which extend through one or both of the legs 38 and 40 of each pair of legs 30, 32, 34 and 36 to a terminal connection within the housing 11 of the optical system 10. The conductors may be coiled to provide extensibility and retractability as the legs 38 and 40 telescope in length. Alternately, the legs 38 and 40 themselves may be employed as the conductor to supply power to the illumination source 70.

The holder 60 may take any shape, such as the generally cubical shape shown in FIGS. 1-4 wherein holder 60 has a generally rectangular cross section. Each holder 60 may take other shapes, such as a circular shape, or other polygonal shapes. The holder 60 may be formed with a linear longitudinal extent or with a shallow radius or curve. All of the holders 60 need not have the same shape depending upon the application and the object to be illuminated.

The illumination source 70, by way of example only, may be formed of a plurality of LEDs 72 arranged in a bank or array within the holder 60. Any number of LEDs 72 may be used to form the illumination source 70. The LEDs 72 may be arranged in a single elongated row, in multiple rows and columns, or in any configuration in the holder 60.

Each illumination source 70 may be controlled by a control means, which includes one or more selector switches or buttons 82 carried on the housing 11 on the optical system 10. Each illumination source 70 may be turned on or off independently of the illumination sources 70 in the other holders 60. The intensity of each illumination source 70 may also be varied as an entire group, or in each individual holder, etc., by means of a suitable selector switch.

A control switch may also be provided to illuminate only certain of the LEDs 72 within each holder 60 independent of other LEDs 72 in the same holder 60.

The LEDs 72 may be provided in any color useful for imaging applications. Thus, the LEDs 72 may emit light in colors of red, blue, yellow, white, black, etc. Controls 80, FIG. 1, may be provided for activating certain color LEDs 72 in one or more holders 60 as necessary for a particular imaging application. All of the switching functions can also be implemented by on display-mouse control through software.

Figure 4:
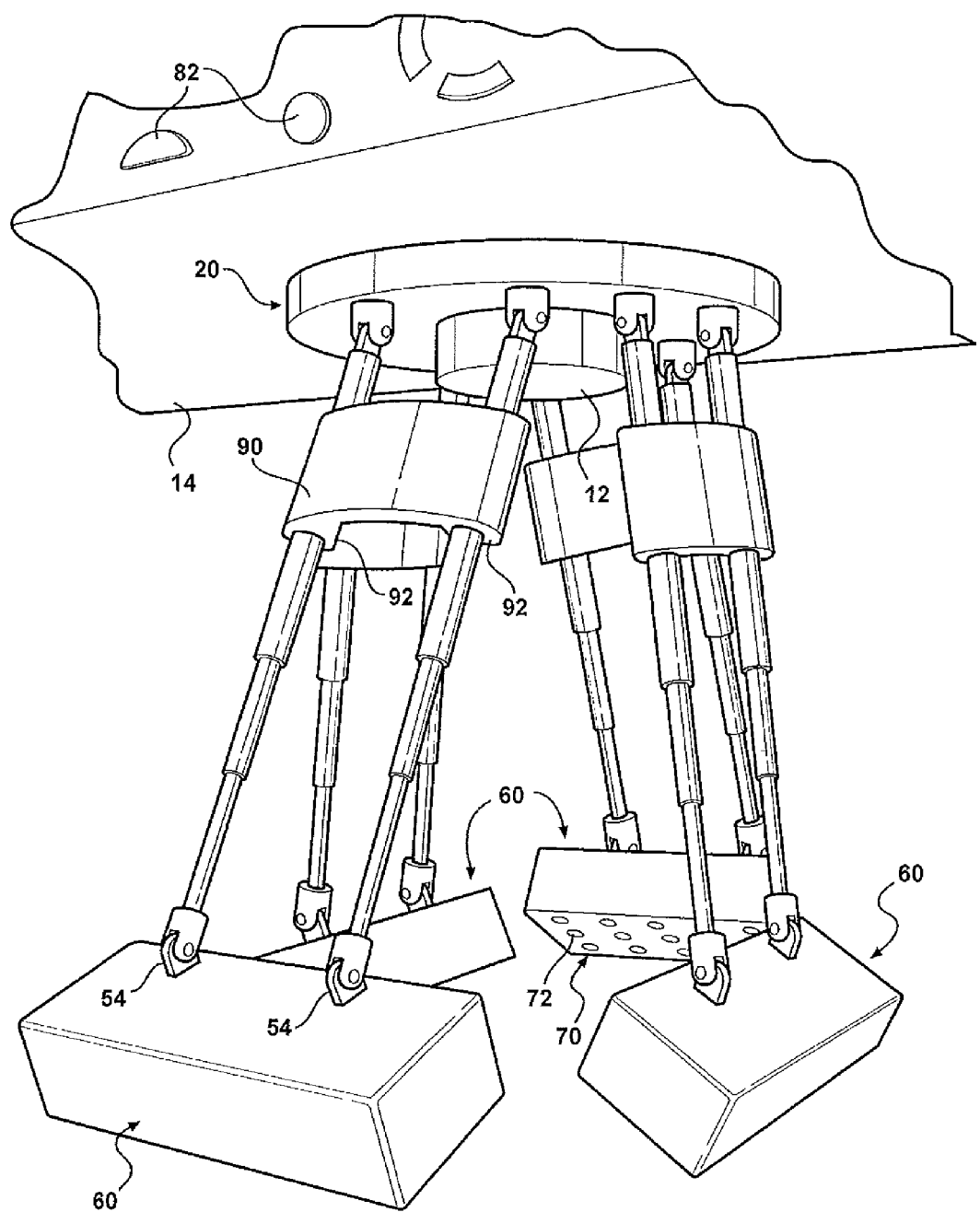
FIG. 4 is a side perspective view of the adjustable light with all the legs depicted in an extended position.

A support 90 shown in FIG. 4, is provided, by way of example only, for each leg pair 30, 32, 34, and 36. The support 90 spans each leg 38 and 40 of each leg pair 30, 32, 34, and 36. By way of example only, the support 90 is formed of a light weight plastic and has spaced projections 92 at opposite ends to provide a snap on capability around each of the legs 38 and 40. The support 90 maintains each leg 38 and 40 of each leg pair 30, 32, 34, and 36 at a consistent spacing during telescoping extension and retraction movements of each leg 38 and 40.

In use, with an object located in the field of view of the lens 12, the holders 60 are positioned relative to the lens 12 by extending or retracting the telescoping legs 38 and 40 of each leg pair 30, 32, 34, and 36 to the desired length relative to the lens 12 and/or the object to be imaged. Each holder 60 can be pivoted about the swivel joints 54 on the respective leg pair 30, 32, 34, and 36 to direct the light from the illumination source 70 in each holder 60 in the proper direction to illuminate the desired surface feature of the object being imaged while minimizing stray light.

It will be understood that the amount of extension and retraction and thereby the length of each leg pair 30, 32, 34, and 36 as well as the angular position of the holder 60 relative to its leg pair 30, 32, 34, and 36 may be adjusted independently of the other leg pairs 30, 32, 34, and 36 and holders 60 so as to direct the light from the illumination source 70 in each holder 60 in the desired direction toward the object being imaged.

Figure 5A:
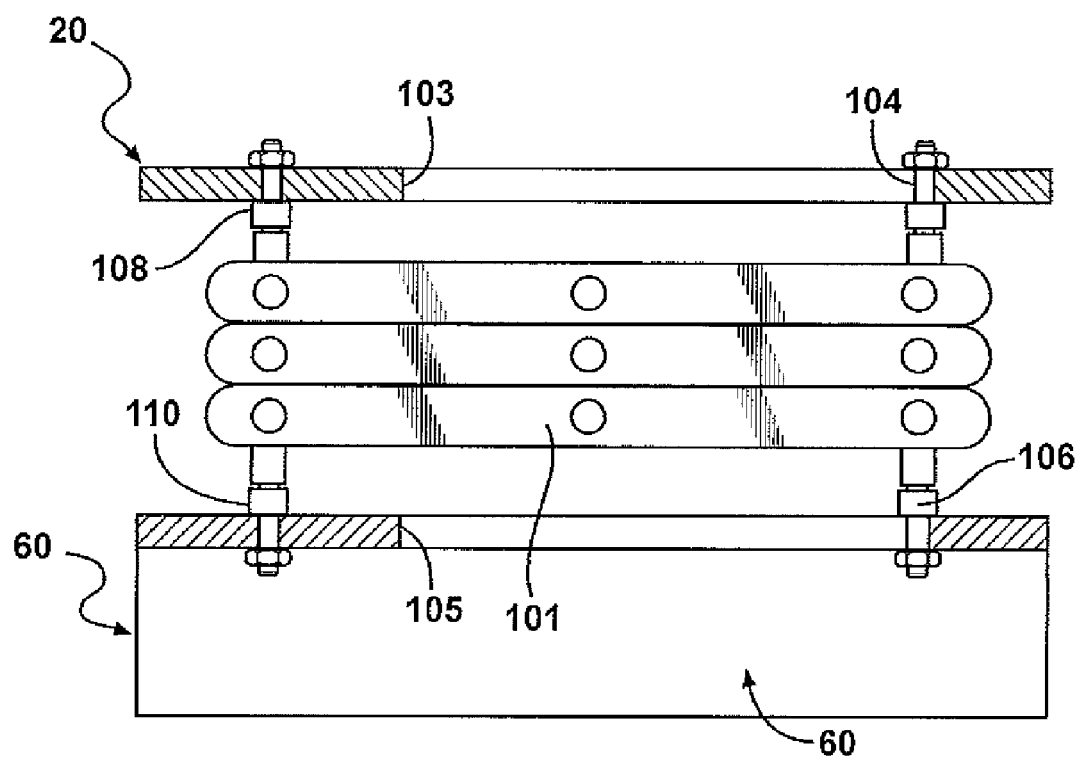
FIGS. 5A and 5B are side elevational views of another aspect of an adjustment means for the adjustable light, shown respectively in retracted and extended positions.
Figure 5B:
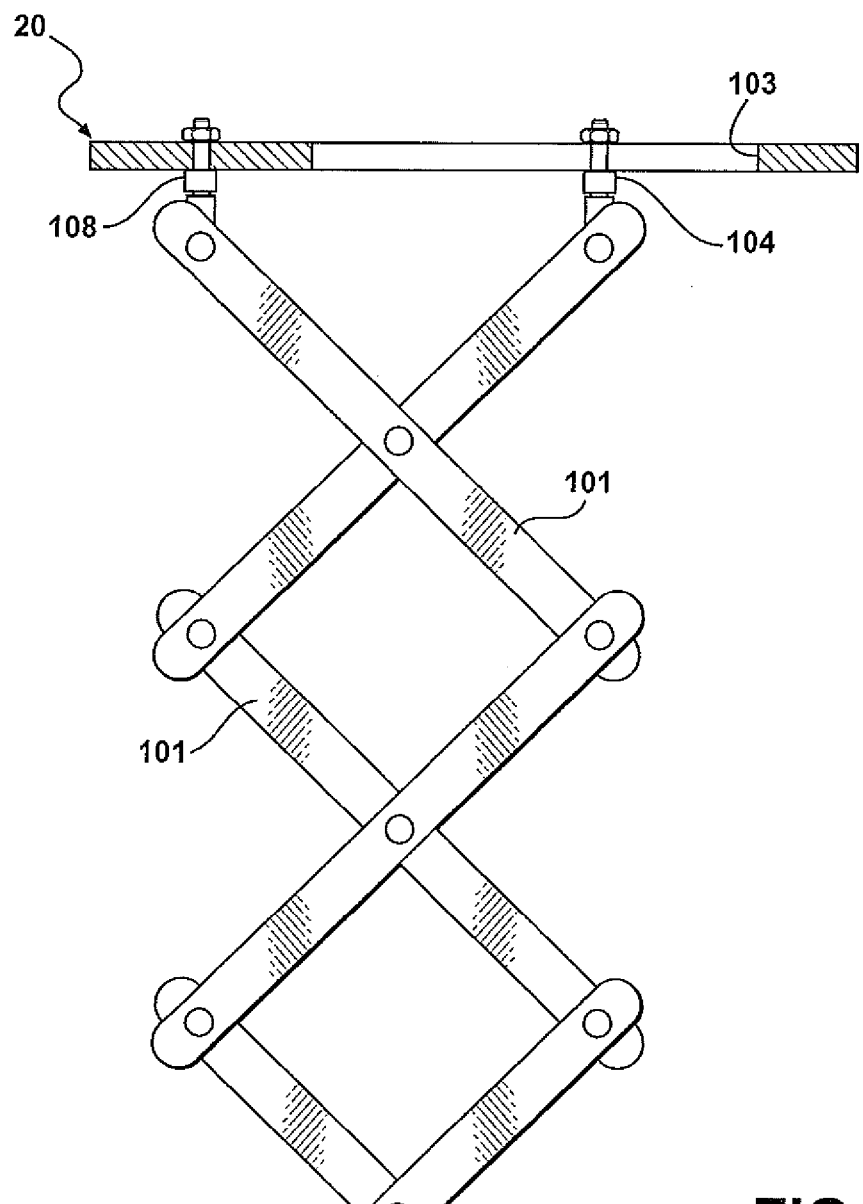

It is also possible to replace the telescopic legs 38 and 40 of the leg pair 30, 32, 34 and 36 with a pantograph type crisscross bar assembly 101 as shown in FIGS. 5A and 5B. In this case, one joint 104 at the mount 20 and one joint 106 at the housing 60 connected to one of the links of the bar assembly 101 is slidable in tracks 103 and 105, respectively. Another pair of joints 108 and 110 pivotally connected to other links of the bar assembly 101 are fixed to the mount 20 and the housing 60, respectively. All other swivel action is the same as described above for the telescopic legs.

What is claimed is:

1. An illumination apparatus for a imaging system having a lens mounted on a housing, the illumination apparatus comprising:

an illumination source including a housing and at least one illuminatable element carried by the housing;

a mount surrounding an imaging system lens;

at least one extensible and retractable support having first and second ends;

a first connection moveably coupling the first end of the support to the mount;

a second connection moveably coupling the second end of the support to the illumination source;

the first end of the support coupled to the first connection and the second end of the support coupled to the second connection; and the support telescopingly adjustable along a central axis to vary the length of the support and thereby vary the distance between the illumination source housing and the imaging system.

2. The illumination apparatus of claim 1 wherein:
the at least one support and the illumination source are pivotally movable through the first connection about a horizontal axis relative to the mount.

3. The illumination apparatus of claim 1 wherein:
the illumination source is pivotally movable through the second connection about a horizontal axis relative to the mount.

4. The illumination apparatus of claim 1 wherein at least one of the first connection and the second connection is a swivel connection swivally connecting the at least one support and one of the mount and the illumination source.

5. The illumination apparatus of claim 1 wherein:
the illumination source includes a plurality of illumination sources, and the at least one support includes a plurality of supports; and
each illumination source movably coupled to one of the supports.

6. The illumination apparatus of claim 1 wherein the support comprises:
an extensible and retractable leg.

7. The illumination apparatus of claim 6, wherein the leg includes first and
second telescoping engaged leg portions.

8. The illumination apparatus of claim 6 wherein:
the leg includes a pair of legs, each leg coupled to one of a pair of first connections and to one of a pair of second connections.

9. The illumination apparatus of claim 1 wherein the illuminatable element comprises:
at least one light emitting diode.

10. The illumination apparatus of claim 1 further comprising:
the illumination source includes a plurality of illumination sources; and
the at least one illuminatable element in each illumination source including a plurality of illumination elements; and
the illuminatable elements in each illumination source being independently controllable with respect to the illuminatable elements in other illumination sources.

11. The illumination apparatus of claim 1 further comprising:
the at least one illuminatable element includes a plurality of illuminatable elements; and
the intensity of the illuminatable elements in the illumination source being variable.

* * * * *